United States Patent
Miller et al.

(10) Patent No.: US 11,151,461 B2
(45) Date of Patent: Oct. 19, 2021

(54) METHOD AND APPARATUS FOR BEHAVIOR-BASED VEHICLE PURCHASE RECOMMENDATIONS

(71) Applicant: Ford Global Technologies, LLC, Dearborn, MI (US)

(72) Inventors: Kenneth James Miller, Canton, MI (US); Thomas G. Leone, Ypsilanti, MI (US)

(73) Assignee: Ford Global Technologies, Dearborn, MI (US)

( * ) Notice: Subject to any disclaimer, the term of this patent is extended or adjusted under 35 U.S.C. 154(b) by 1040 days.

(21) Appl. No.: 15/641,418

(22) Filed: Jul. 5, 2017

(65) Prior Publication Data
US 2019/0012603 A1   Jan. 10, 2019

(51) Int. Cl.
*G06N 5/04* (2006.01)
*H04L 29/08* (2006.01)
*G06Q 30/06* (2012.01)

(52) U.S. Cl.
CPC ........... *G06N 5/04* (2013.01); *G06Q 30/0631* (2013.01); *H04L 67/12* (2013.01); *H04L 67/22* (2013.01); *H04L 67/306* (2013.01)

(58) Field of Classification Search
CPC ...... G06N 5/04; G06Q 30/0631; H04L 67/12; H04L 67/22; H04L 67/306
See application file for complete search history.

(56) References Cited

U.S. PATENT DOCUMENTS

| | | | |
|---|---|---|---|
| 8,452,797 B1 * | 5/2013 | Paleja | G06Q 30/02 707/767 |
| 9,288,270 B1 * | 3/2016 | Penilla | G06Q 10/02 |
| 2013/0232027 A1 | 9/2013 | Reich et al. | |
| 2013/0275214 A1 * | 10/2013 | Kote | G06Q 30/0255 705/14.53 |
| 2015/0073933 A1 | 3/2015 | Stieg et al. | |
| 2015/0254719 A1 * | 9/2015 | Barfield, Jr. | G06Q 30/0273 705/14.53 |
| 2016/0035150 A1 | 2/2016 | Barfield, Jr. et al. | |

OTHER PUBLICATIONS

Paiva et al, "A Personality-Based Recommender System for Semantic Searches in Vehicles Sales Portals", Jun. 2017, 600-612 (Year: 2017).*

* cited by examiner

*Primary Examiner* — Daniel C Puentes
(74) *Attorney, Agent, or Firm* — Michael Spenner; Brooks Kushman P.C.

(57) ABSTRACT

A system includes a processor configured to wirelessly receive data indicating vehicle-feature usage for an individual vehicle. The processor is also configured to aggregate received data to form a feature-usage customer profile defining feature preferences. The processor is further configured to select vehicles associated with a customer-classification, including predefined feature-usage characteristics, the customer-classification determined based on a correlation between the predefined feature-usage characteristics and the aggregated data in the feature-usage profile defining feature preferences. The processor is also configured to compare the aggregated data to the selected vehicles to determine a vehicle having features preferred by a customer as indicated by the aggregated data in the feature-usage profile and recommend the determined vehicle to the customer.

11 Claims, 2 Drawing Sheets

METHOD AND APPARATUS FOR BEHAVIOR-BASED VEHICLE PURCHASE RECOMMENDATIONS

TECHNICAL FIELD

The illustrative embodiments generally relate to methods and apparatuses for behavior-based vehicle purchase recommendations.

BACKGROUND

A customer choosing a new vehicle has to consider many attributes and trade-offs such as initial purchase price, fuel economy, acceleration performance, handling, ride comfort, bad weather capability, etc. Many consumers rely on gut feeling, advice from friends/family/salespeople, or on reviews from car magazines, consumer organizations, etc. Each customer has a unique set of needs, preferences, and priorities that shows in their unique driving experiences, driving style, and driving environment.

Further, people may tend to recommend vehicles that they would prefer, without considering the needs of a recomendee. Additionally, the recommenders, especially sales people who otherwise do not know the customer, may have no idea how the person drives or what features or even vehicles might be good for recommendation.

In addition to vehicle purchase, this problem applies to any vehicle product such as aftermarket parts, or services. Consumer needs and preferences for tunings, performance parts, even oil changes can vary wildly from consumer to consumer. While vehicles may be able to recommend when oil change is needed generally, it may be difficult to tell from a brief discussion which type of oil to recommend to a customer.

Ironically, it is usually the person who knows the customer the least (the sales person) who also knows the most about possible vehicle choices. Unless a salesperson personally knows a customer, or has been working with a customer for a long time, that salesperson will likely make assumptions based on short conversations and observations, and the "best" vehicle for a customer may never even be discussed.

SUMMARY

In a first illustrative embodiment, a system includes a processor configured to wirelessly receive data indicating vehicle-feature usage for an individual vehicle. The processor is also configured to aggregate received data to form a feature-usage customer profile defining feature preferences. The processor is further configured to select vehicles associated with a customer-classification, including predefined feature-usage characteristics, the customer-classification determined based on a correlation between the predefined feature-usage characteristics and the aggregated data in the feature-usage profile defining feature preferences. The processor is also configured to compare the aggregated data to the selected vehicles to determine a vehicle having features preferred by a customer as indicated by the aggregated data in the feature-usage profile and recommend the determined vehicle to the customer.

In a second illustrative embodiment, a system includes a processor configured to determine and weight a customer's vehicle-attribute preferences based on data received from the customer's vehicle indicating the customer's behavior. The processor is also configured to select vehicles driven by other customers having the same weighted customer vehicle-attribute preferences as the customer's vehicle-attribute preferences. The processor is further configured to determine a vehicle from the selected vehicles having predefined weighted attribute values within a predefined tolerance of the customer's vehicle attribute preferences and recommend the determined vehicle to the customer.

In a third illustrative embodiment, a computer-implemented method includes choosing one of a plurality of customer groups based on correspondence between customer vehicle-attribute preference values associated with a customer profile and attribute-preference parameters defining each of the customer groups. The method also includes comparing the customer vehicle-attribute preference values to predefined attribute values associated with a plurality of vehicles pre-associated with chosen group to determine vehicles having attribute values within a predefined tolerance of the customer vehicle-attribute preference values and recommending the determined vehicles.

DETAILED DESCRIPTION

As required, detailed embodiments are disclosed herein; however, it is to be understood that the disclosed embodiments are merely illustrative and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
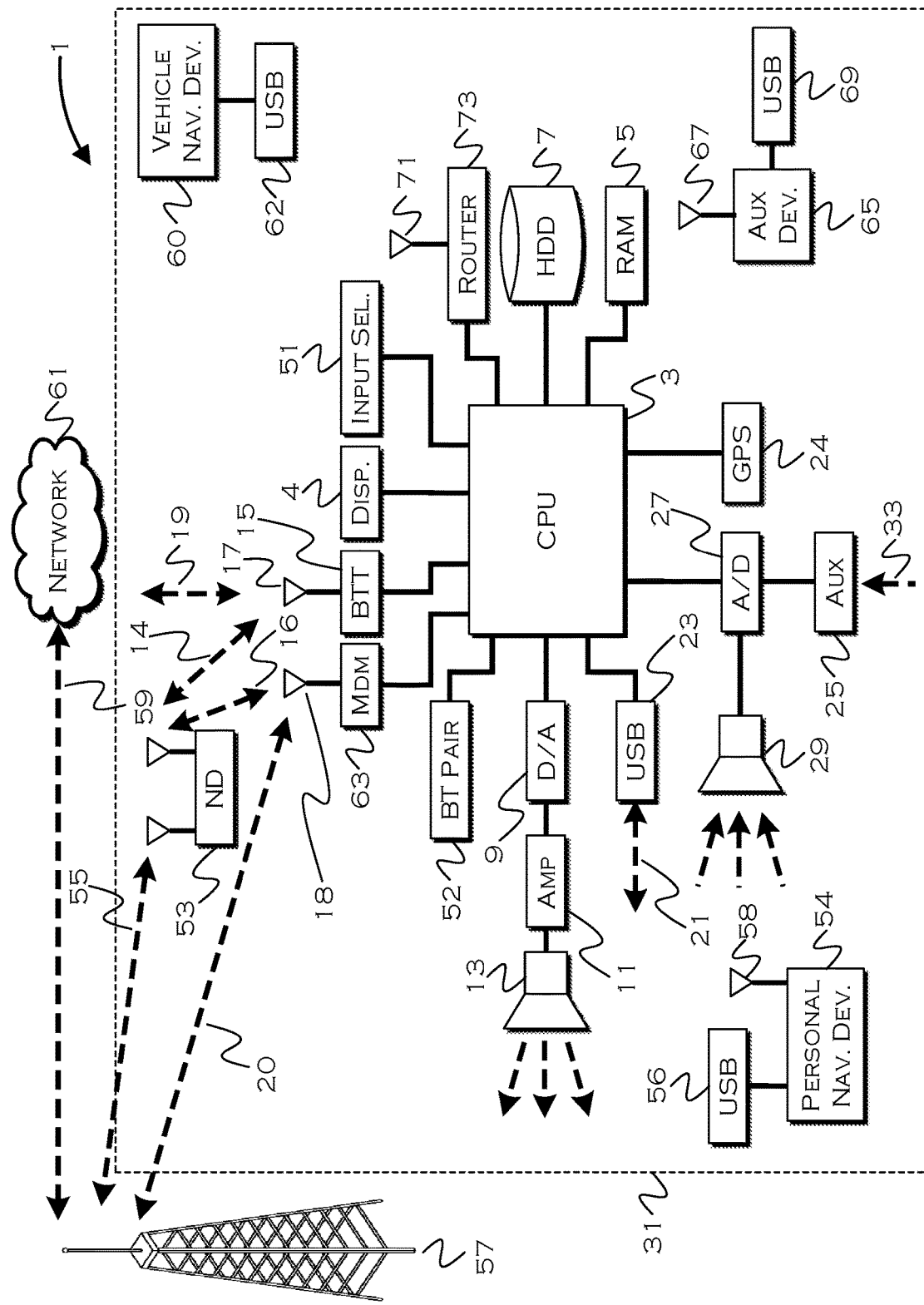
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a Wi-Fi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include Wi-Fi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the interne, and is still used, it has been largely replaced by hybrids of Code Domain Multiple Access (CDMA), Time Domain Multiple Access (TDMA), Space-Domain Multiple Access (SDMA) for digital cellular communication. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., Wi-Fi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a Wi-Fi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

With the proliferation of improved analytic usage, such as that provided by artificial intelligence, cognitive computing, big data, etc., vehicle OEMS can utilize enhanced methods that use each customer's individual driving data and feature usage to provide reliable customized product and service recommendations.

Initially, a system may classify driver groupings based on observed driving data and statistical pattern recognition. The groupings are potentially limitless, and can also share overlap. For example, there could be a group of drivers who drive aggressively when alone and defensively when there are other occupants. This could overlap with a group of drivers who drive aggressively at all times. In both groupings, aggressive drivers of at least some degree might benefit from enhanced traction control, acceleration and braking. In the first group, the aggressive drivers might also benefit from side-curtain airbags and inflatable seat belts, since those people are also safety conscious (at least at times). By using characteristics common to each group, and by comparing gathered data on an individual driver to the characteristics, a driver can be placed into any number of possible groupings, and those groupings may have recommended features or vehicle systems associated therewith.

Driver feature usage can also be considered. For example, the "aggressive/safe" driver above may currently drive a vehicle having 4WD, but may literally never have used 4WD once in two years. Thus, even though 4WD might be one of the safety recommendations associated with "safe" driving, this particular feature is either unimportant to the driver, or the driver may have never known the feature existed. While an assumption may need to be made, assuming that the driver simply does not care about 4WD will allow a vehicle recommendation to focus on features that may be more appealing to this particular driver.

Once initial parameters have been formulated for groupings, the system can begin to compare individual driving data against the grouped parameters. It is even possible, for example, to determine which vehicle a person eventually selected, and fine tune groupings into which that person fell based on the actual vehicle purchased. This iterative refinement process can allow for better and better predictions about vehicle features important to particular types of people.

Figure 2:
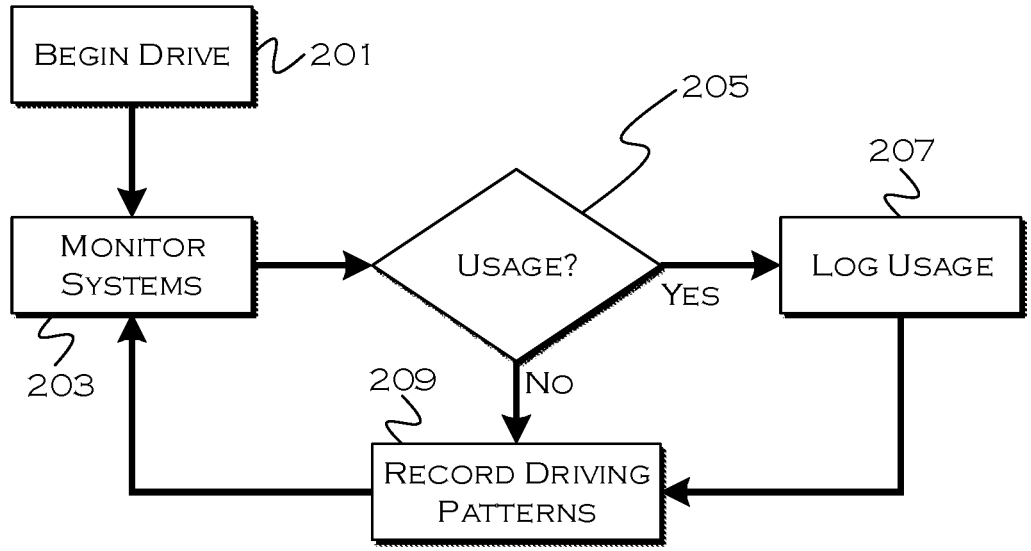
FIG. 2 shows an illustrative process for vehicle system usage monitoring.

FIG. 2 shows an illustrative process for vehicle system usage monitoring. This illustrative system gathers vehicle driving history and vehicle-use pattern recognition to determine patterns between customers' driving data and customers' desired attributes. This data is then compared to established groupings to recommend products and services that matches a customer's likely desired vehicle attributes and/or likely desired vehicle attributes observed or predicted for other customers of similar driving behavior.

It is worth noting that by assuming that at least a large subset of people are driving vehicles that are somewhat appropriate, initial preferences based on driving behavior can be built using those customer's behavior crossed with their current vehicles/vehicle attributes. While eventual future purchase data can be back-fed into the system to fine-tune predictions, a reasonable baseline can be established by observing current behavior and feature usage in current vehicles.

For example, if it is assumed that 80% of people driving vehicles having engines of a certain power level actually intentionally chose a powerful engine, then the behavior of all people driving those vehicles can be roughly correlated to certain types of people who prefer aggressive vehicles with around 80% certainty. Other actions and behaviors may allow further classification, but drivers who exhibit behavior similar to these people, but who currently lack a powerful engine, might benefit from a recommended engine upgrade, for example.

By analyzing individual behavior, the illustrative embodiments may be able to recommend a next car purchase or optional features/aftermarket upgrades that matches a customer's desired attributes (even if the customer does not expressly know they desire those attributes).

In the illustrative example shown, the process detects 201 that a drive has begun, and begins to monitor 203 a variety of vehicle systems and features. These systems can include virtually any system, such as engine speed, acceleration, pedal position, braking, window state, HVAC state, seat position, wheel position, etc. Other systems features can include, for example, media players, media streaming, telematics usage, application usage, navigation usage, etc.

Some system monitoring may be foregone, if the system is standard on all or nearly all vehicles, but even monitoring of "standard" systems might provide an opportunity to recommend an aftermarket upgrade if the system is regularly utilized. For example, every vehicle may include a USB port, but frequent USB cable swapping may cause recommendation of a vehicle including multiple ports, or an aftermarket upgrade to a multi-port system. Since a customer may never even know such an option was possible, this could be a nice offering that would be otherwise never used by a customer.

Additional values measured could include usage statistics such as fuel usage, refueling propensity, cruise control usage, power take-off usage, lift gate usage, even rear seat usage and rear seat stowage time. The process detects 205 any usage of a designated monitored system or parameter, and logs 207 the usage accordingly. Consumable fuel usage, and similar variables, can also be logged periodically to build a record.

The process further logs 209 driving data, which can include aggressiveness, braking habits, acceleration habits, turn radius, speed through turns, etc. Once the drive ends, the process can upload all of this data to the cloud for analysis. Alternatively, the process can periodically upload the data, or even locally store the data until such time as a new vehicle may be needed. Since the process may also use this data to fine tune other predictions, however, it will probably be more common to at least periodically upload the observation data, so that the cloud can fine-tune the aggregate data sets.

Figure 3:
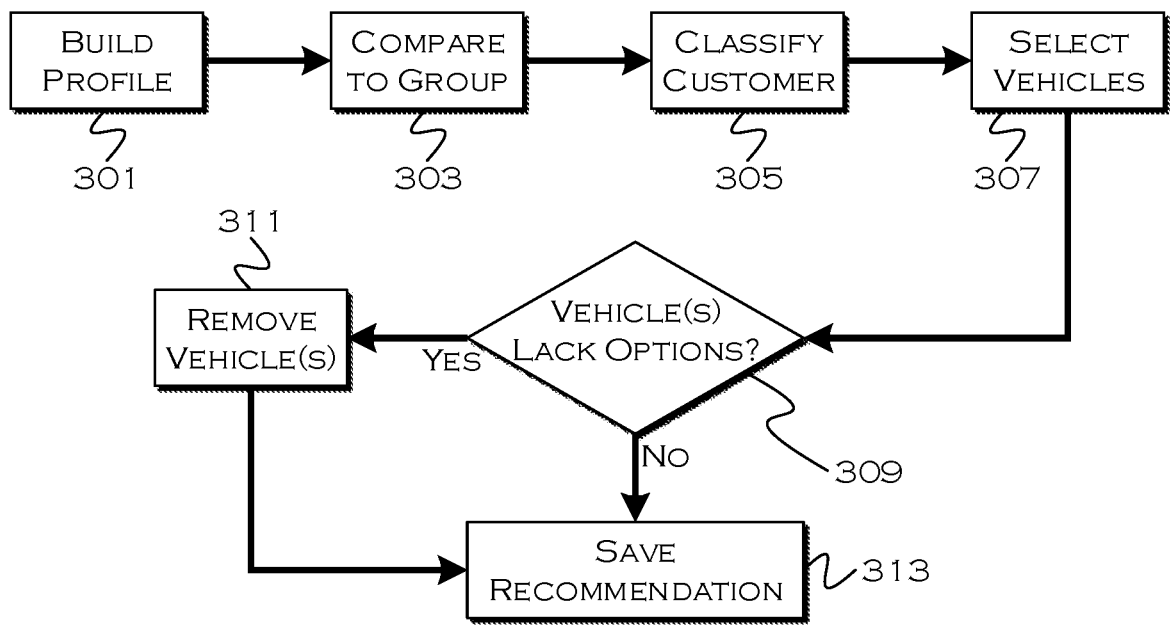
FIG. 3 shows an illustrative process for vehicle recommendation.

FIG. 3 shows an illustrative process for vehicle recommendation. In this example, the cloud can then use the uploaded data to build 301 drive pattern profiles for the individual user. This can include usage patterns, drive duration patterns, aggressive/defensive patterns, weather driving behavior, etc. Feature usage statistics and/or patterns can also be built and observed by the cloud. The cloud can use the data to assemble a comprehensive driver profile, and the attributes of this profile can allow for alignment of the driver with one or more customer profiles indicative of larger consumer groups.

Once the process has built a profile, having certain characteristics or parameters associated therewith, the process can compare 303 these aspects of the profile to larger customer groupings. This can allow the process to classify 305 the customer based on multiple customer groupings.

Since a driver may exhibit multiple driving behavior patterns or driving types, weighting can also be used to further refine classifications. More frequently observed behavior, patterns and feature usage can be assigned higher weighted values than less frequently observed characteristics, which can assist in resolving possible conflicts between vehicles. Since most drivers probably exhibit behavior that would correlate to virtually every group, at some point in time, the weighting can remove outlying behavior and provide recommendations that do not include dozens of vehicles with hundreds of different features, which might otherwise be recommended based on one-off observations.

For features that can be measured in terms of "use," the weighting correlation could be based on frequency of usage (times/drive, times/month, etc.). For features that are more loosely defined, such as "acceleration preference," the weighting could be based on commonality of occurrence, e.g., how many times does the user accelerate aggressively from a stopped position. Other weighting values may also be determined in an even looser sense by profiling behavior. For a characteristic such as "fuel economy," the customer driving behavior can be compared to "optimal" behavior (in terms of fuel economy) to determine whether or not the customer regularly exhibits fuel conscious driving. Even though different "usage" characteristics or preferences may have different methods for weighting, the weighting can be standardized in the sense that if a customer uses a "usable" feature more frequently than 90% of observed customers, that feature could be given a weight of 0.9, and if the customer drives as fuel consciously as 50% of customers, that feature could be given a weight of 0.5, which standardizes the values on a common scale based on comparison to other customers.

Weighted classifications may also be obtained by correlating customer driving behavior to observed customer preferences. For example, 90% of customers who buy the most fuel efficient vehicles may also drive in the top 20% of drive smoothness (resisting aggressive braking and acceleration). Thus, if a customer is observed driving with a smoothness registering in the top 20% of observed behavior, there is a high likelihood that customer cares about fuel efficiency. This can be observed even if the customer currently drives a highly fuel-inefficient vehicle. Correlations such as this can be used to cross-reference observed behavior with observed purchase patterns to provide a highly tailored set of vehicle recommendations.

Once a weighted classification of a customer has been built, the process can use recommended vehicles associated with high-value customer group matches. This can provide 307 a base-set of vehicles from which a customer might like to choose. Since the process has also observed which features and options are commonly used by the customer, the process may further determine 309 whether any of the base-set vehicles lack commonly used or highly weighted options. The process can remove 311 those vehicles from the recommendations and build and save 313 a recommendation set tailored to the customers observed driving patterns and option usage patterns.

Since the exact customer weightings may not exactly match the weighted values associated with any particular vehicle (See table below), the process can choose a vehicle based on which of the vehicles has the same ordered ranking of weightings (e.g., top down), or, for example, based on which of the vehicles has the closest total value of rankings (e.g., the total difference between customer weightings and vehicle-associated weightings), or through any other similar process of comparison.

The process can even attempt to recommend several "optimal" vehicle choices, based on assigning attribute prioritization to an "ideal" (but not necessarily existent) vehicle based on observed customer behavior compared to existing group profiles, and then finding a vehicle for which predefined attributes most closely match the "ideal" vehicle profile. For example, such a process may result in the following (using an importance scale or weighting of 0-1):

|  | Ideal Vehicle | Available Vehicle A | Available Vehicle B |
| --- | --- | --- | --- |
| Fuel Economy | .7 | .6 | .3 |
| Cargo Capacity | .7 | .8 | .5 |
| Acceleration | .8 | .9 | .2 |
| Handling | .3 | .2 | .6 |

The above table reveals that vehicle A is a much closer match than vehicle B, even if the customer is currently driving vehicle B.

It is also worth noting that certain overriding factors (e.g., always buys SUVs, very cost conscious, etc.) may be used based on observed behavior and salesperson notes, so that certain vehicles can be ignored without wasting customer time or recommending a class of vehicle that is outside the customer price range. Even when these vehicles are excluded, however, the correlation can be performed with the remaining vehicles, resulting in a "best option" from the subset meeting fixed constraints.

The process may determine a point in a vehicle life-cycle at which to recommend a new vehicle, or the customer may actually request recommendations at any particular time. The recommendation data can also be sent to dealers or advertisers who can tailor offerings based on the recommendation, so the customer only receives offers and mail pertaining to vehicles the customer might most likely want. Such tailored recommendations could even drive customers to make early purchases, based on the fact that the customer may see how much better suited the recommended vehicle is than a current vehicle.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined in logical manners to produce situationally suitable variations of embodiments described herein.

What is claimed is:

1. A system comprising:
a processor configured to:
wirelessly receive data indicating an amount of vehicle-feature usage of user-controllable, optionally-activatable vehicle features, for an individual vehicle;
aggregate received data to form a feature-usage customer profile defining feature preferences, including assigning a weighted value to one or more feature preferences, the weighted value based on a level of feature-usage of the user-controllable, optionally-activatable vehicle features, indicated by the data considered relative to others' level of feature usage of a same feature;
select vehicles associated with a customer-classification, including predefined feature-usage weighted values, the selected customer-classification determined based on a closest-correlation between the predefined feature-usage weighted values and the weighted values in the feature-usage customer profile defining feature preferences;
compare the weighted values to the selected vehicles to determine a vehicle having features preferred by a customer as indicated by the weighted values in the feature-usage profile; and
automatically generate a recommendation for the determined vehicle, responsive to vehicle-life of the individual vehicle passing a defined trigger point.

2. The system of claim 1, wherein the feature-usage customer profile includes a customer-preference definable based on the aggregated data, but not present in the aggregated data.

3. The system of claim 2, wherein the customer-preference includes fuel economy, definable based on a drive-smoothness characteristic included in the aggregated data.

4. A system comprising:
a processor configured to:
determine and weight a customer's vehicle-attribute preferences based on data received from a customer's vehicle indicating customer behavior, including an amount of usage of a plurality of user-controllable, optionally-activatable vehicle features of the customer vehicle, the weighting including comparing overall usage of one or more of the features to amounts of feature usage of a same feature observed for a group of other customers, to derive a comparative weight;
select vehicles driven by other customers having the same weighted customer vehicle-attribute preferences as the customer's weighted vehicle-attribute preferences;
determine a vehicle from the selected vehicles having predefined weighted attribute values within a predefined tolerance of the customer's weighted vehicle attribute preferences; and
automatically generate a recommendation for the determined vehicle, responsive to determining that the determined vehicle more closely correlates to the customer's weighted vehicle-attribute preferences than the customer's vehicle.

5. The system of claim 4, wherein the processor is configured to determine the vehicle based on which of the selected vehicles shares the same ranked order of weighted attribute values as a ranked order of the customer's vehicle-attribute preferences, when more than one of the selected vehicles includes predefined weighted attribute values within the predefined tolerance of the customer's vehicle attribute preferences.

6. The system of claim 4, wherein the processor is configured to determine the vehicle based on which of the selected vehicles shares the least total deviation between weighted attributes and the customer's vehicle-attribute preference weightings, when more than one of the selected vehicles includes predefined weighted attribute values within the predefined tolerance of the customer's vehicle attribute preferences.

7. The system of claim 4, wherein the processor is configured to weight the customer's vehicle-attribute preferences based on comparison of the customer's behavior to a data set gathered from a second group of customers larger than and including the other customers.

8. The system of claim 4, wherein vehicle-attribute preferences include fuel economy.

9. The system of claim 4, wherein vehicle-attribute preferences include individual preferences for defined vehicle feature usage.

10. The system of claim 4, wherein vehicle-attribute preferences include acceleration capability.

11. The system of claim 4, wherein vehicle-attribute preferences include cargo weight.

* * * * *